United States Patent
Christiansen et al.

(10) Patent No.: US 12,499,089 B2
(45) Date of Patent: Dec. 16, 2025

(54) DIRECTORY TREE DELETE AS A SUPPORTED FILE SYSTEM OPERATION

(71) Applicant: MICROSOFT TECHNOLOGY LICENSING, LLC, Redmond, WA (US)

(72) Inventors: Neal Robert Christiansen, Bellevue, WA (US); Chandra Kumar Konamki Vijayamuneeswaralu, Monroe, WA (US); Neeraj Kumar Singh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 201 days.

(21) Appl. No.: 18/213,440

(22) Filed: Jun. 23, 2023

(65) Prior Publication Data
US 2024/0427737 A1    Dec. 26, 2024

(51) Int. Cl.
*G06F 16/00* (2019.01)
*G06F 16/13* (2019.01)
(Continued)

(52) U.S. Cl.
CPC ............ *G06F 16/162* (2019.01); *G06F 16/13* (2019.01); *G06F 21/6218* (2013.01); *G06F 2221/2141* (2013.01)

(58) Field of Classification Search
CPC .... G06F 16/162; G06F 16/13; G06F 21/6218; G06F 2221/2141
See application file for complete search history.

(56) References Cited

U.S. PATENT DOCUMENTS

| 10,678,452 B2 | 6/2020 | Karr et al. |
| 2021/0266329 A1 | 8/2021 | Fuhry |

(Continued)

FOREIGN PATENT DOCUMENTS

| EP | 3614290 A1 | 2/2020 |
| WO | 2023277962 A1 | 1/2023 |

OTHER PUBLICATIONS

"14.6 Deleting Files", Retrieved From: https://www.gnu.org/software/libc/manual/html_node/Deleting-Files.html, Retrieved on: Nov. 8, 2022, 2 Pages.

(Continued)

*Primary Examiner* — Paul Kim
(74) *Attorney, Agent, or Firm* — Getech Law LLC; Jun Ye

(57) ABSTRACT

The system described herein introduces a file system operation that enables a file system to delete a directory tree without the overhead associated with opening each file in the directory tree, marking the file for deletion, and closing the file. Accordingly, the file system is able to delete directories and files in the directory tree independent of communicating with, and being transparent to, filter drivers in the operating system. The file system operation is implemented via a directory tree delete attribute included in a request for deletion of a directory tree. The file system can perform the file system operation in a foreground manner or in a deferred manner based on the directory tree delete attribute respectively specifying foreground deletion or deferred deletion. By operating on files and directories in a single invocation, the file system can optimize overheads related to security checks and data transfer across a user-to-kernel boundary.

20 Claims, 8 Drawing Sheets

(51) Int. Cl.
 *G06F 16/16* (2019.01)
 *G06F 21/62* (2013.01)

(56) References Cited

U.S. PATENT DOCUMENTS

2022/0121500 A1 4/2022 Peercy et al.
2022/0413879 A1* 12/2022 Passey ............... G06F 9/44521

OTHER PUBLICATIONS

"Deleting a tree directory with tree-delete", Retrieved on: https://knowledge.hitachivantara.com/Documents/Storage/NAS_Platform/13.9/NAS_Administration_Guides/File_Services_Administration_Guide/19_Deleting_a_tree_directory_with_tree-delete, Dec. 4, 2020, 5 Pages.

"File_Disposition_Information_Ex Structure (Ntddk.H)", Retrieved From: https://learn.microsoft.com/en-us/windows-hardware/drivers/ddi/ntddk/ns-ntddk-_file_disposition_information_ex, Jan. 21, 2022, 2 Pages.

Don, Burn, "How delete folders and subfolders?", Retrieved From: https://social.msdn.microsoft.com/Forums/sqlserver/en-US/ea06c17d-6217-4a4e-abad-1750ce0c3b34/how-delete-folders-and-subfolders?forum=wdk, Jan. 17, 2017, 7 Pages.

Gite, Vivek, "How To Remove Non Empty Directory In Linux", Retrieved From: https://www.cyberciti.biz/faq/how-to-remove-non-empty-directory-in-linux/, Jul. 30, 2022, 14 pages.

Nikhil, Aggarwal, "Delete an Entire Directory Tree Using Python | shutil.rmtree() method", Retrieved From: https://www.geeksforgeeks.org/delete-an-entire-directory-tree-using-python-shutil-rmtree-method/, Jul. 5, 2021, 11 Pages.

Vorwerk, et al., "Delete Directories Rapidly on the Cluster", Retrieved From: https://docs.netapp.com/us-en/ontap/flexgroup/fast-directory-delete-asynchronous-task.html, Sep. 8, 2022, 4 Pages.

International Search Report and Written Opinion received for PCT Application No. PCT/US2024/034562, Sep. 5, 2024, 12 pages.

* cited by examiner

DIRECTORY TREE DELETE AS A SUPPORTED FILE SYSTEM OPERATION

BACKGROUND

An operating system of a computing device (e.g., a server, a desktop computer, a laptop computer) is configured to interact with a file system to perform operations in association with files stored on a storage device (e.g., open a file, delete a file, write to a file, read from a file, replace a file, copy a file, move a file, search for a file, create a file). A file system is configured as a hierarchical structure that includes nodes representing directories and/or files. Moreover, a file system comprises logic that enables navigation through the nodes to locate a file (e.g., a document, an executable, a spreadsheet, an image, a video, etc.) and to perform an operation in association with the file.

In certain instances, an application executing via the operating system may want to delete a large number of files (e.g., hundreds or even thousands of files). Generally, a large number of files can be associated with a directory tree. Accordingly, a directory tree includes a plurality of nodes that represent multiple directories and/or multiple files located in the multiple directories. In one example, a large number of files are created and stored in a directory tree when a developer is using a software development application to write and/or revise program code for a software product. The files may be referred to as "intermediate" files in the sense that the files are temporarily stored as part of the directory tree. In this example, when the intermediate files are no longer needed, the software development application can attempt to delete all the files in the directory tree at the same time.

In a conventional approach to deleting all the files in a directory tree based on a request from an application, the operating system and/or the file system is required to enumerate each directory in the directory tree, open each file that is found, mark the file for deletion, and then close the file. This creates a large amount of overhead for the operating system and/or the file system, particularly when the number of files in the directory tree is large (e.g., hundreds or even thousands of files). For instance, opening a file requires the following operations to be performed by the operating system and/or the file system: (i) transitioning the operating system from a user mode to a kernel mode, (ii) creating a file object as well as input/output request packets (IRPs) and/or other transient structures useable to inform registered operating system components (e.g., filter drivers, often referred to as "minifilters", configured for anti-virus, backup agents, encryption products, etc.) about the opening of the file, (iii) calling into the registered operating system components so the registered operating system components can process the opening of the file, (iv) creating a Context Control Block (CCB) (e.g., "FsContext2") for the file object, (v) creating a handle for the file object and adding a handle entry to a table, (vi) providing the handle to the application requesting the deletion, and (vii) transitioning the operating system from the kernel mode back to the user mode.

Furthermore, marking the file for deletion requires the following operations to be performed by the operating system and/or the file system: (i) transitioning the operating system from the user mode to the kernel mode, (ii) creating IRPs and/or other transient structures useable to inform the registered operating system components about the deletion of the file, (iii) calling into the registered operating system components that are interested in monitoring changes to the data of the file, (iv) designating the file for deletion, and (v) transitioning the operating system from the kernel mode back to the user mode.

Finally, closing the file requires the following operations to be performed by the operating system and/or the file system: (i) transitioning the operating system from the user mode to the kernel mode, (ii) creating IRPs and/or other transient structures useable to inform the registered operating system components about the deletion of the file, (iii) calling into the registered operating system components so the registered operating system components can process the closing of the file, (iv) removing the name of the file (often referred to as a "filename") from the directory in which the file is located (often referred to as removing the file from the "namespace"), (v) freeing the storage allocated for the data of the file (e.g., freeing allocated clusters), (vi) removing the handle entry from the table to free the file object, and (vii) transitioning the operating system from the kernel mode back to the user mode.

While some of the operations outlined above may only need to be performed once for different files, the conventional approach to deleting a directory tree still requires that each file in the directory tree be opened, marked for deletion, and then closed, thereby increasing the latency associated with deleting a directory tree. With the advent of low latency storage media (e.g., Non-Volatile Memory Express (NVME)), this increased latency is more conspicuous to the operating system, the application requesting the deletion, and/or a user of a computing device. It is with respect to these and other technical challenges that the disclosure made herein is presented.

SUMMARY

The system described herein introduces a file system operation that enables a file system to delete a directory tree without the overhead associated with opening each file in the directory tree, marking the file for deletion, and closing the file. Stated alternatively, the file system is configured to support an operation that deletes directories and/or files in the directory tree independent of (e.g., without) communicating with, and being transparent to, upper-level software in the operating system. The aforementioned software is commonly referred to as "upper-level" software because the file system is configured between the software and the storage devices on which the file data is stored, and therefore, the software is in a level (or layer) "above" the file system. As described above, the upper-level software in the operating system include operating system components that have previously registered an interest in monitoring changes to the data of a file (e.g., deletion of the data of the file) and/or a directory. In one example, these operating system components include filter drivers, often referred to as "minifilters", which can be configured for anti-virus, backup agents, encryption products, and so forth.

As described herein, the file system operation that enables the file system to delete the directory tree is indicated by a directory tree delete attribute (e.g., a flag) that can be passed to the file system by an application within a request to delete the directory tree. Furthermore, the request includes an identification of the directory tree. In one example, the identification of the directory tree includes a name of a directory where the directory tree begins (e.g., a root directory). In another example, the identification of the directory tree can include names of the individual directories and/or individual files that compose the directory tree. The request also includes a token carrying the identity of the application that issues the request and, more importantly, a user that initiates the request via the application. The token and other security information attached to the files determine whether the delete may proceed in the directory tree.

In response to receiving the request, the file system is configured to ensure that the application and the user are authorized to delete the files in the directory tree. To do this, the file system retrieves access control information (e.g., access control lists (ACLs)) that is associated with the files and/or directories in the directory tree. To retrieve the access control information, the file system enumerates the directories and the files in the directory tree. The file system can then perform a security check by processing the token received in the request and the retrieved access control information. In one example, the file system performs the security check by iterating, on a per file and/or a per directory basis, through token list entries and ACL list entries to identify a token list entry that matches an ACL entry. After a match is identified, the ACL entry is checked to confirm that it authorizes deletion of the file, as an ACL entry can define other authorized actions (e.g., access to the file, modification of the file) but may prohibit deletion of the file.

If the security check determines that the application and the user are authorized to delete a file in the directory tree, the file system deletes the file as part of the file system operation. After the file system operation is fully performed (e.g., all the files in the directory tree are deleted), the file system can indicate successful completion to the application that requested the directory tree delete. If the security check determines that the application and the user are not authorized to delete one of the files in the directory tree, the file system fails the file system operation and indicates unsuccessful completion to the application that requested the directory tree delete.

As described above, upper-level software components such as filter drivers have registered an interest in monitoring access to, modification of, and/or deletion of a file (e.g., the file data) and/or a directory. Accordingly, in various embodiments, the file system cannot ignore the registered interest for security, policy, and/or other reasons. To solve this problem, the file system is configured to ask for and receive authorization, in advance, from the upper-level software components to support and perform future file system operations that implement a directory tree delete. Stated alternatively, the upper-level software components must "opt-in" to the file system operations that implement the directory tree deletes.

For a given file system operation, the file system can confirm that the upper-level software components have provided the needed authorization to delete a directory tree independent of (e.g., without) communicating with the upper-level software components. In one example, an upper-level software component specifically provides the authorization for a predefined storage unit (e.g., a particular volume) of the storage device on which the directories and the files of the directory tree are stored. In another example, an upper-level software component specifically provides the authorization for the directory tree itself. That is, the authorization names the root directory of the directory tree.

As described herein, the file system can perform the delete tree file system operation in different ways. In one example, the file system can perform the delete tree file system operation in the foreground based on the directory tree delete attribute specifying foreground deletion of the files and the directories in the directory tree. First, the file system deletes the files and the directories under the directory tree. The deletion of a file can fail if the token does not authorize the user and/or the application to delete the file. Second, the file system deletes the root of the directory tree. Performing the delete tree operation in the foreground based on the directory tree delete attribute specifying foreground deletion of the files and the directories in the directory tree executes both these actions in a foreground thread. That is, the files and the directories in the directory tree, as well as the root directory of the directory tree, are deleted in the foreground thread. Deleting a file or a directory includes two distinct actions. First, the file system removes a name of the file (commonly referred to as a "filename") or the directory from the directory tree. This action is often referred to as removing the file or the directory from the namespace. Second, the file system frees the storage media (e.g., clusters) allocated to the data of the file or the directory. If the file is in use, the allocated storage media may be freed at a later time after the file is no longer in use.

In another example, the file system can perform the delete tree operation in a deferred manner based on the directory tree delete attribute specifying deferred deletion of the files in the directory tree. Performing the delete tree operation in the deferred manner based on the directory tree delete attribute specifying deferred deletion executes two actions-one in a foreground thread and the other in a background thread. That is, the name of the root directory of the directory tree is removed from the namespace via an inline instruction in the foreground thread and the files and/or directories under the root directory of the directory tree are deleted via a background thread. This deferred approach prioritizes and focuses on removing the root directory of the directory tree from the namespace and delays, or defers, the more costly (e.g., resource-intensive) operation of deleting the files and/or the directories under the directory tree.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

The techniques described herein introduce a file system operation that enables a file system to delete a directory tree without the overhead associated with opening each file in the directory tree, marking the file for deletion, and closing the file. Stated alternatively, the file system is configured to support an operation that deletes directories and/or files in the directory tree independent of (e.g., without) communicating with, and being transparent to, upper-level software in the operating system. The file system operation can be implemented via a directory tree delete attribute included in a request for deletion of a directory tree. The file system can perform the file system operation in different ways. In one example, the file system can perform the file system operation in the foreground based on the directory tree delete attribute specifying foreground deletion of the files and the directories in the directory tree. In another example, the file system can perform the file system operation in a deferred manner based on the directory tree delete attribute specifying deferred deletion of the files in the directory tree. By operating on files and directories in a single invocation, the file system can optimize overheads related to security checks and data transfer across a user-to-kernel boundary.

Various examples, scenarios, and aspects that enable the techniques described herein are described below with respect to FIGS. 1-8.

Figure 1:
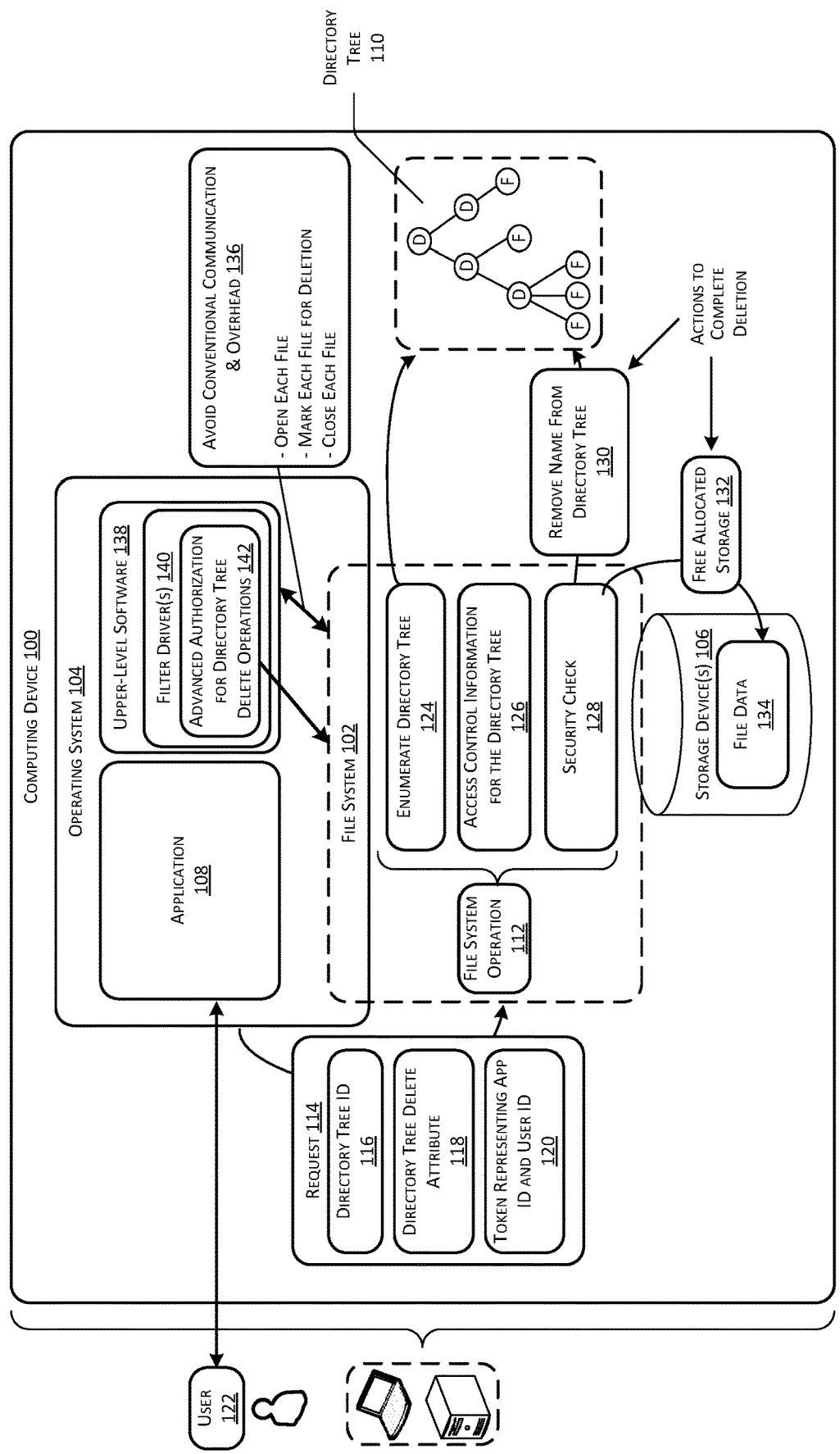
FIG. 1 illustrates an example computing device executing a file system that supports the deletion of a directory tree without the overhead associated with opening each file in the directory tree, marking the file for deletion, and closing the file.

FIG. 1 illustrates an example computing device 100 executing a file system 102 that supports the deletion of a directory tree without the overhead associated with opening each file in the directory tree, marking the file for deletion, and closing the file. The computing device 100 can be a server computer, a desktop computer, a laptop computer, etc. Therefore, the computing device 100 includes an operating system 104 that is configured to interact with the file system 102 to perform operations in association with files stored on storage device(s) 106, such as a hard disk drive, an optical disc drive, and so forth.

As mentioned above, the file system 102 is configured as a hierarchical structure that includes nodes representing directories and/or files. Moreover, the file system 102 comprises logic that enables navigation through the nodes to locate a file (e.g., a document, an executable, a spreadsheet, an image, a video) and to perform an operation in association with the file. In association with the techniques described herein, the operating system 104 executes an application 108 (e.g., an operating system application, a third-party application installed on the computing device 100) that wants to delete a large number of files (e.g., hundreds or even thousands of files) associated with a directory tree 110.

The directory tree 110 includes a plurality of nodes that represent multiple directories (represented by a "D") and/or multiple files (represented by an "F") located in the multiple directories, as shown in FIG. 1. The directories and/or files in a directory tree are located under a directory at the top of the directory tree (e.g., a root directory). The directory tree 110 shown in FIG. 1 includes four directory "D" nodes and five file "F" nodes for ease of discussion. It is understood in the context of this disclosure that the technical benefits described herein are more apparent if the directory tree 110 includes more directories and/or files than the number shown in FIG. 1.

Accordingly, the file system 102 described herein is configured to support a new file system operation 112 that deletes the directory tree 110 in an efficient manner. To implement the file system operation 112, the file system 102 receives a request 114 from the application 108. The request 114 includes an identification 116 of the directory tree 110. In one example, the identification 116 of the directory tree 110 includes a name of a directory at the top of the directory tree 110 (e.g., the upper most directory node in the namespace hierarchy where the directory tree 110 begins such as the root node or directory). In another example, the identification 116 of the directory tree 110 can include a path (e.g., pathname) for the directory being deleted. In yet another example, the identification of the directory tree 110 can include names of the individual directories and/or individual files that compose the directory tree 110. The request 114 further includes a directory tree delete attribute 118 (e.g., a flag) and a token 120 indicating the identity of the application 108 that issues the request 114 and, more importantly, the user 122 that initiates the request via the application 108. The token contributes to the decision of whether the application is authorized to delete the directories and/or the files in the directory tree 110. Consequently, the token 120 represents both the application 108 (e.g., an application identification) and the user 122 (e.g., a user identification).

In response to receiving the request 114, the file system 102 is configured to ensure that the application 108 and the user 122 are authorized to delete the files in the directory tree 110 via the file system operation 112. To do this, the file system 102 enumerates 124 the directories and/or the files in the directory tree 110 and retrieves access control information 126 (e.g., access control lists (ACLs)) that are associated with the directories and/or the files in the directory tree 110. The file system 102 can then perform a security check 128 by processing the token 120 received in the request 114 and the access control information 126. In one example, the file system 102 performs the security check 128 by iterating, on a per file and/or a per directory basis, through token list entries and ACL entries to identify a token list entry that matches an ACL entry. After a match is identified, the matched ACL entry is checked to confirm that it authorizes deletion of the file or the directory, as an ACL entry can define other authorized actions (e.g., access to a file, modification of a file) but may prohibit deletion of the file or the directory.

If the security check 128 determines that the application 108 and the user 122 are authorized to delete a file or a directory in the directory tree 110, then the file system 102 proceeds to implement two actions that compose the deletion of a file. First, the file system 102 removes 130 a name of a file (commonly referred to as a "filename") or a directory from the directory tree 110. Second, the file system 102 frees 132 the storage media (e.g., clusters) allocated to the data 134 of the file or the directory.

After the file system operation 112 is fully performed (e.g., all the directories and/or all the files in the directory tree 110 have been deleted), the file system 102 can indicate successful completion to the application 108 that requested the directory tree delete. If the security check 128 determines that the application 108 and the user 122 are not authorized to delete one of the files or the directories in the directory tree 110, the file system 102 fails the file system operation 112 and indicates unsuccessful completion to the application 108 that requested the directory tree delete. In various examples, the file system operation 112 can fail after the file system 102 deletes some, but not all, of the files in the director tree 110. Accordingly, the request 114 may result in a partial directory tree delete.

Consequently, implementation of the file system operation 112 within the file system 102 avoids the conventional communication and overhead 136 associated with opening each file in the directory tree, marking the file for deletion, and closing the file. For instance, the file system 102 can perform the file system operation 112 without transparency to upper-level software 138 components, such as filter drivers 140 (alternatively referred to as "minifilters"), that have previously registered an interest in monitoring access to, modification of, and/or deletion of a file (e.g., the file data) and/or a directory.

To ensure the functionality (e.g., security) of the filter drivers 140 is not frustrated via implementation of the file system operation 112 based on the directory tree delete attribute 118, the file system 102 is configured to ask for and receive authorization 142, in advance, for the file system 102 to support and perform the file system operation 112 that implements a directory tree delete. Stated alternatively, the filter drivers 140 must "opt-in" to the file system operations that implement the directory tree deletes.

For a given file system operation such as file system operation 112, the file system 102 can confirm that the filter drivers 140 have provided the needed authorization 142 to delete a directory tree 110 independent of (e.g., without) communicating with the filter drivers 140. In one example, a filter driver 140 specifically provides the authorization 142 for a predefined storage unit (e.g., a particular volume) of the storage device 106 on which the directories and the files of the directory tree 110 are stored. In another example, a filter driver 140 specifically provides the authorization 142 for the directory tree 110 itself. That is, the authorization 142 identifies a name of the parent (e.g., root) directory where the directory tree 110 begins.

Figure 2:
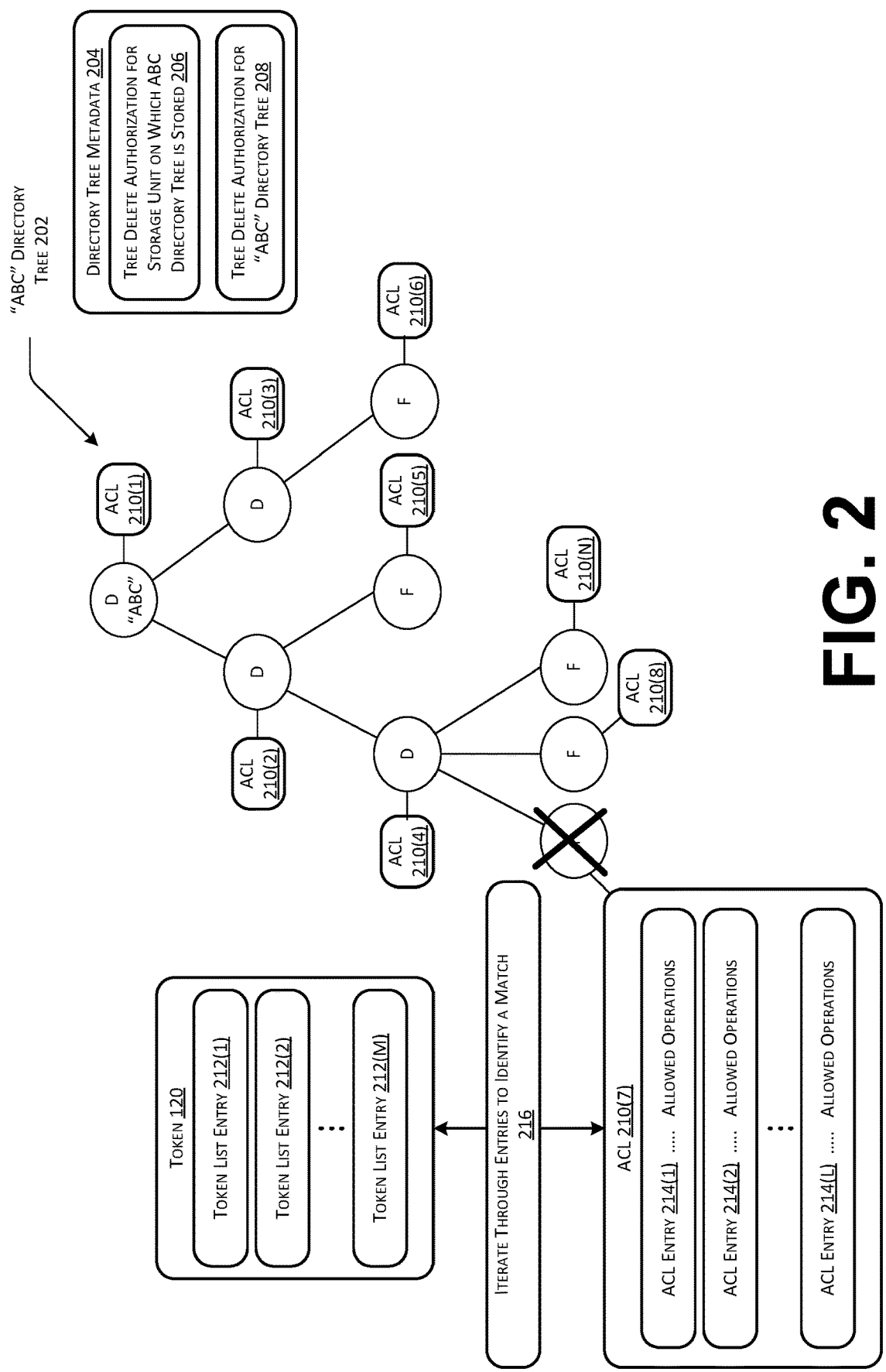
FIG. 2 illustrates a diagram in which a security check is performed between token list entries and access control list entries associated with access control information for a file.

FIG. 2 illustrates a diagram in which a security check is performed between token list entries and ACL entries in an ACL of a file. As described above, to perform the file system operation 112, the file system 102 needs to ensure that the application 108 and the user 122 are authorized to delete all the files and/or directories in the directory tree 110. FIG. 2 illustrates an enumerated directory tree (e.g., directory tree 110) identified as the "ABC" directory tree 202 in the file system (e.g., "ABC" being the name of the directory tree). To proceed with the file system operation 112, the file system 102 checks metadata 204 stored in association with the "ABC" directory tree 202 to confirm that the filter drivers 140 have authorized the file system operation 112 to be performed without the file system 102 providing the typical transparency to the filter drivers 140. As described above, a filter driver 140 can provide the authorization 142 for a predefined storage unit (e.g., a particular volume) of the storage device 106 on which the "ABC" directory tree 202 is stored, as shown via element 206. Alternatively, a filter driver 140 can provide the authorization 142 for the directory tree 202 itself by identifying a name of the directory where the directory tree 202 begins, as shown via element 208.

As shown in FIG. 2, each node of the "ABC" directory tree 202 can be associated with an ACL 210(1-N). A file can have its own unique ACL or a file can inherit an ACL from a directory in which the file is located. While the file system 102 may require the use of ACLs for files, the use of ACLs for directories may be optional.

The token 120 includes a list of token entries, referred to as token list entries 212(1-M), where M can include any number (e.g., one, two, three, five, ten, one hundred). A token list entry includes an identifier for a group of users to which the user 122 belongs (e.g., "Full Time Employees", "Finance Department", "Executive Team"). For discussion purposes, FIG. 2 illustrates that ACL 210(7) includes a list of ACL entries, referred to as ACL list entries 214(1-L), where L can include any number (e.g., one, two, three, five, ten, one hundred). Similar to a token list entry, an ACL entry includes an identifier for a group of users (e.g., "Full Time Employees", "Finance Department", "Executive Team") and operations (e.g., access a file, modify a file, delete a file, move a file, copy a file) the group of users are authorized to implement with respect to a file.

Performance of the security check 128 in FIG. 1 includes iterating through token list entries 212(1-M) and ACL entries 210(7) for a given file to identify a match 216 between a particular token list entry and a particular ACL entry. Once a match is found, the file system 102 checks the authorized operations specified by the matched ACL entry to confirm that the application 108 and the user 122 are authorized to delete the file (as shown via the "X" through the file node associated with ACL 210(7). This iteration through the lists is performed for all the files and/or directories in the "ABC" directory tree 202. That is, after comparing the token 120 to ACL 210(7), the token 120 is compared to ACL 210(8), 210(N), 210(5), and 210(6) (in no particular order). In one example, the file system 102 is configured to perform the security check for all the files and/or directories before deleting any file, as this reduces the chance of implementing partial directory tree delete. However, in other examples, the file system 102 is configured to start deleting files and/or directories before the security check is performed for all the files and/or directories.

In some embodiments, after all the files in a particular directory are deleted and the directory is empty, the directory itself can also be deleted (e.g., removed from the namespace). In alternative embodiments, a security check at the directory-level may need to be performed to confirm that an empty directory can be deleted. For example, the file system 102 can compare the token 120 to ACL 210(4).

Figure 3:
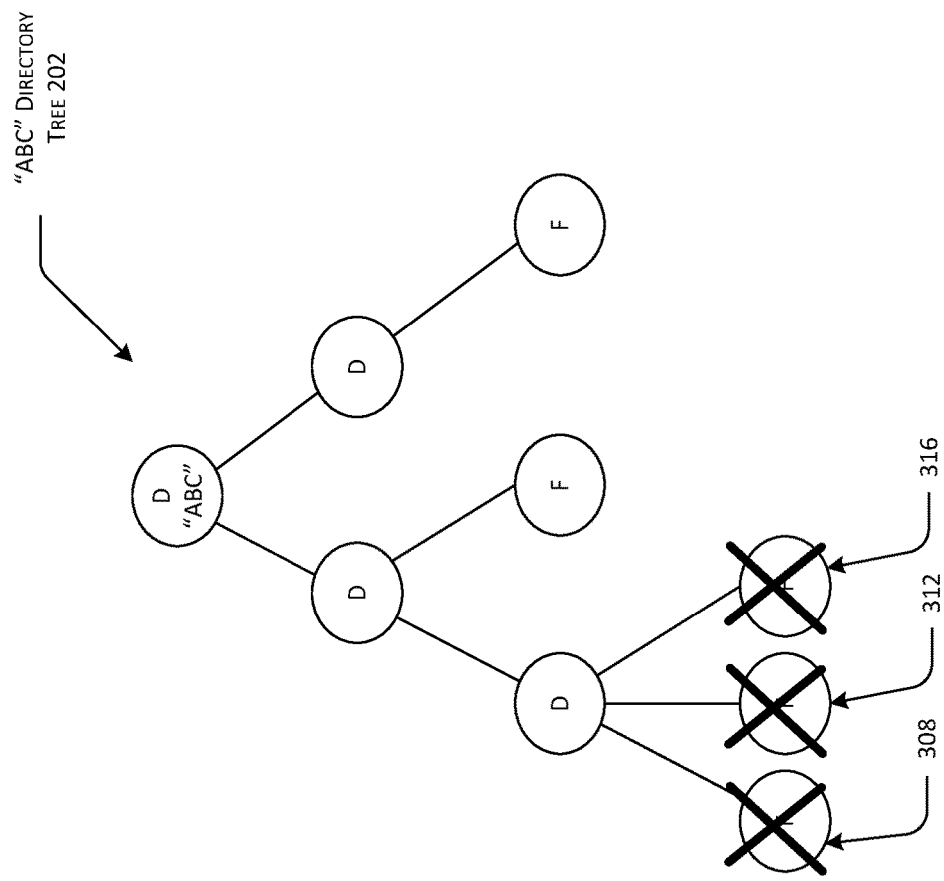
FIG. 3 illustrates a diagram in which foreground deletion of files in a directory tree is implemented.
Figure 3:
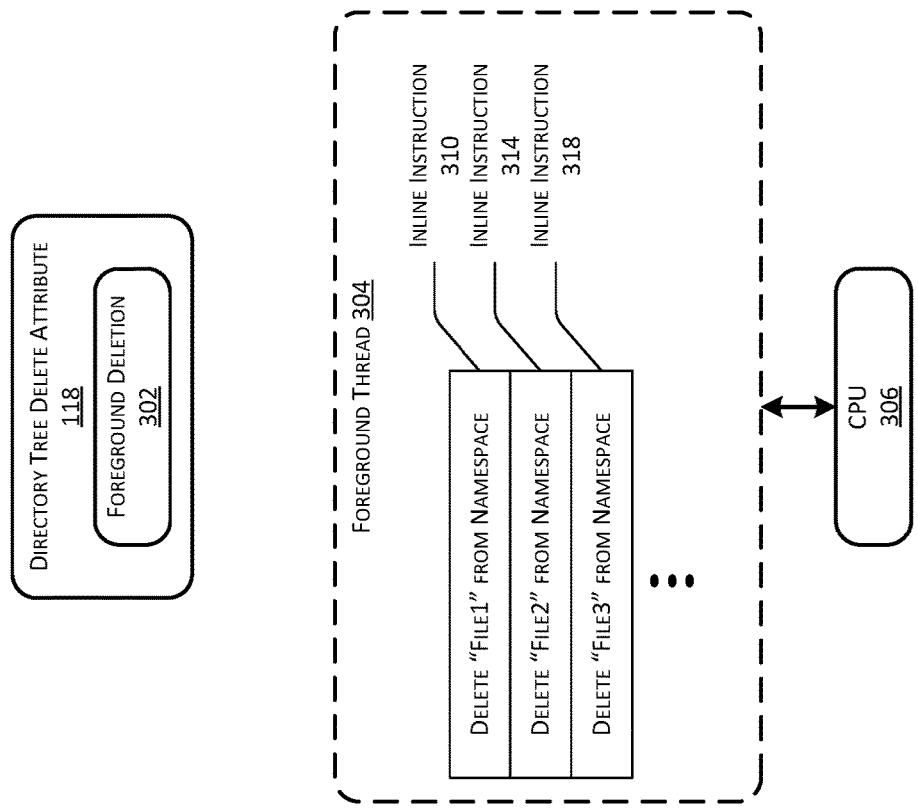

FIG. 3 illustrates a diagram in which the directory tree delete attribute 118 in the request 114 specifies foreground deletion 302 of files in a directory tree is to be implemented. Based on the specified foreground deletion 302, the file system 102 is configured to perform the file system operation 112 in a foreground thread 304 associated with a central processing unit (CPU) 306. That is, the filename (e.g., "File1") for a particular file 308 is deleted from the namespace for the "ABC" directory tree 202 via a first inline instruction 310 of the foreground thread 304. As described above, deleting a file includes removing the filename ("File1") from the ABC directory tree 202 and freeing the storage media (e.g., clusters) allocated to the file data. Next, FIG. 3 illustrates that the filename (e.g., "File2") for another file 312 is deleted from the namespace for the "ABC" directory tree 202 via a second inline instruction 314 of the foreground thread 304 and that the filename (e.g., "File3") for yet another file 316 is deleted from the namespace for the "ABC" directory tree 202 via a third inline instruction 318 of the foreground thread 304.

Figure 4:
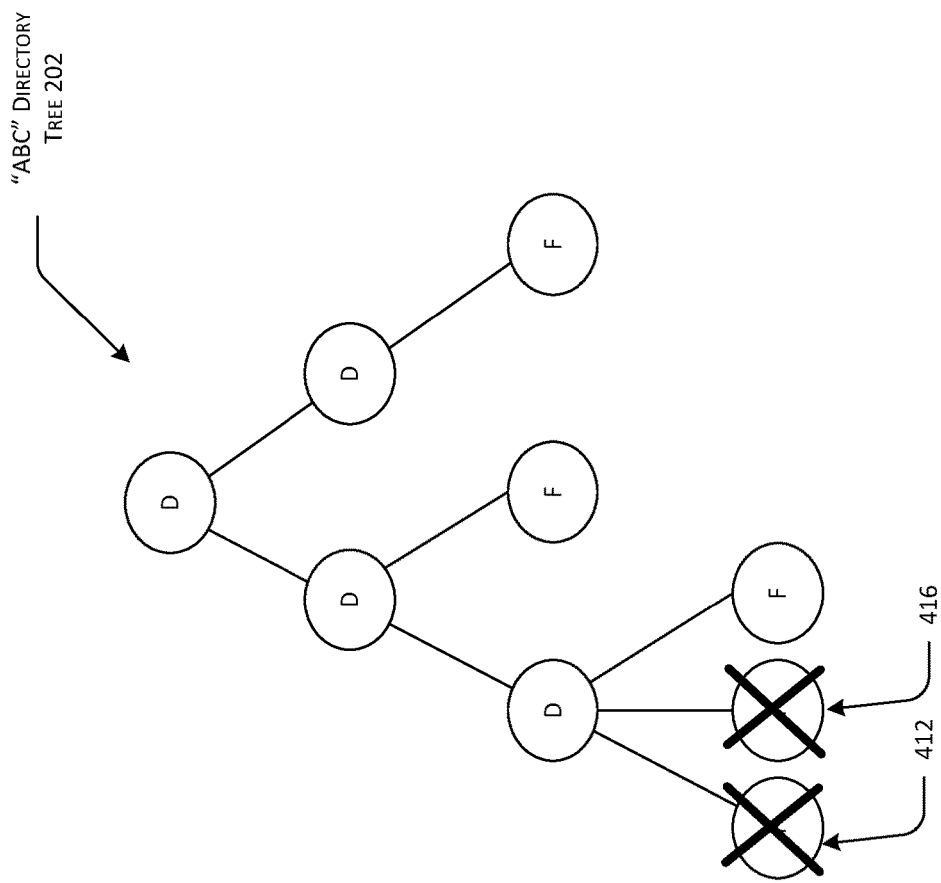
FIG. 4 illustrates a diagram in which deferred deletion of files in a directory tree is implemented.
Figure 4:
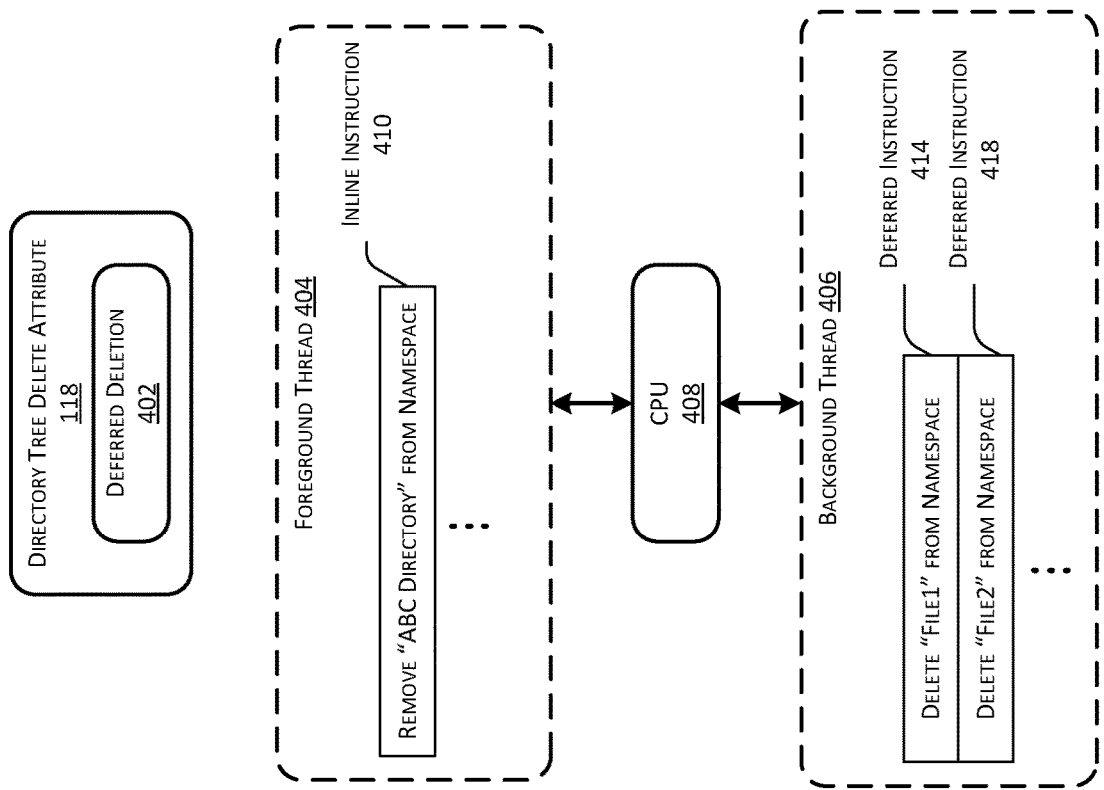

FIG. 4 illustrates a diagram in which the directory tree delete attribute 118 in the request 114 specifies deferred deletion 402 of files in a directory tree is to be implemented. Based on the specified deferred deletion 402, the file system 102 is configured to perform the file system operation 112 using a foreground thread 404 and a background thread 406 associated with the CPU 408. That is, the name of the root directory (e.g., the "ABC directory") of the directory tree is removed from the namespace via an inline instruction 410 in the foreground thread 404 and the files and/or directories under the root directory of the directory tree are deleted via the background thread 406. As shown, the filename (e.g., "File1") for a particular file 412 is deleted from the namespace for the "ABC" directory tree 202 via a first deferred instruction 414 of the background thread 406 and the filename (e.g., "File2") for another file 416 is removed from the namespace for the "ABC" directory tree 202 via a second deferred instruction 418 of the background thread 406. This deferred approach prioritizes and focuses on removing the root directory of the directory tree from the namespace and delays, or defers, the more costly (e.g., resource-intensive) operation of deleting the files and/or the directories under the directory tree.

In various examples, if neither of the foreground deletion 302 nor the deferred deletion 402 are specified (or conversely if both the foreground deletion 302 and the deferred deletion 402 are specified), the file system 102 can prioritize, or default to the use of, the deferred deletion 402 as a result of the technical benefits it provides.

Figure 5:
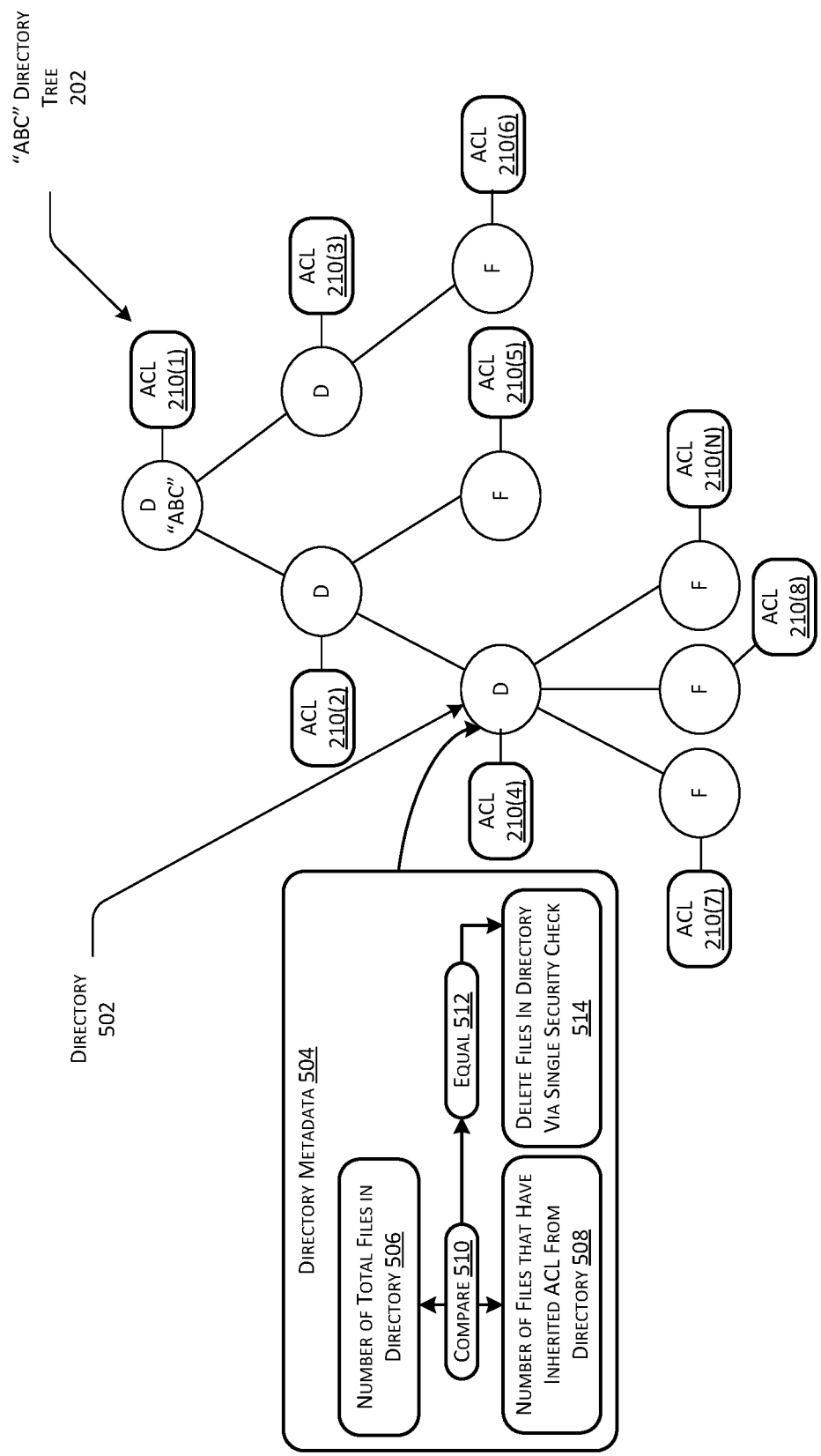
FIG. 5 illustrates a diagram in which a more efficient deletion of files in a particular directory of a directory tree can be implemented.

FIG. 5 illustrates a diagram in which a more efficient deletion of files in a particular directory of a directory tree can be implemented. As shown, a directory 502 in the ABC directory tree 202 of FIG. 2 is associated with directory metadata 504. The file system 102 is configured to store information in the directory metadata 504 indicating whether all the files in a given directory 502 have inherited an ACL from the directory 502. Stated alternatively, the file system stores information indicating whether the ACLs 210(7-N) are the same as ACL 210(4) because the files stored in directory 502 automatically (e.g., by default) inherit the directory-level ACL 210(4).

Consequently, the file system 102 tracks and/or counts a number 506 of total files in the directory (e.g., three for directory 502) and stores the number 506 in the directory metadata 504. Moreover, the file system 102 tracks and counts a number 508 of files that have an ACL that is inherited from the directory 502. When performing the security check 128, the file system 102 compares 510 the number 506 to the number 508 and if the comparison 510 determines the number 506 is equal 512 to the number 508 then the file system 102 can delete all the files in the directory 502 via implementing a single security check 514. Stated alternatively, the file system 102 does not have to implement a security check 128 for each of the files in the directory 502. Rather, the file system 102 only needs to perform a security check 128 using the ACL of one file in the directory 502 and if a match is identified the file system 102 can delete the remainder of the files in the directory because they have the same ACL. Alternatively, the file system 102 may not need to visit a file at all and instead may perform a security check 128 at the directory-level ACL which is the same as the ACLs of the files.

Figure 6:
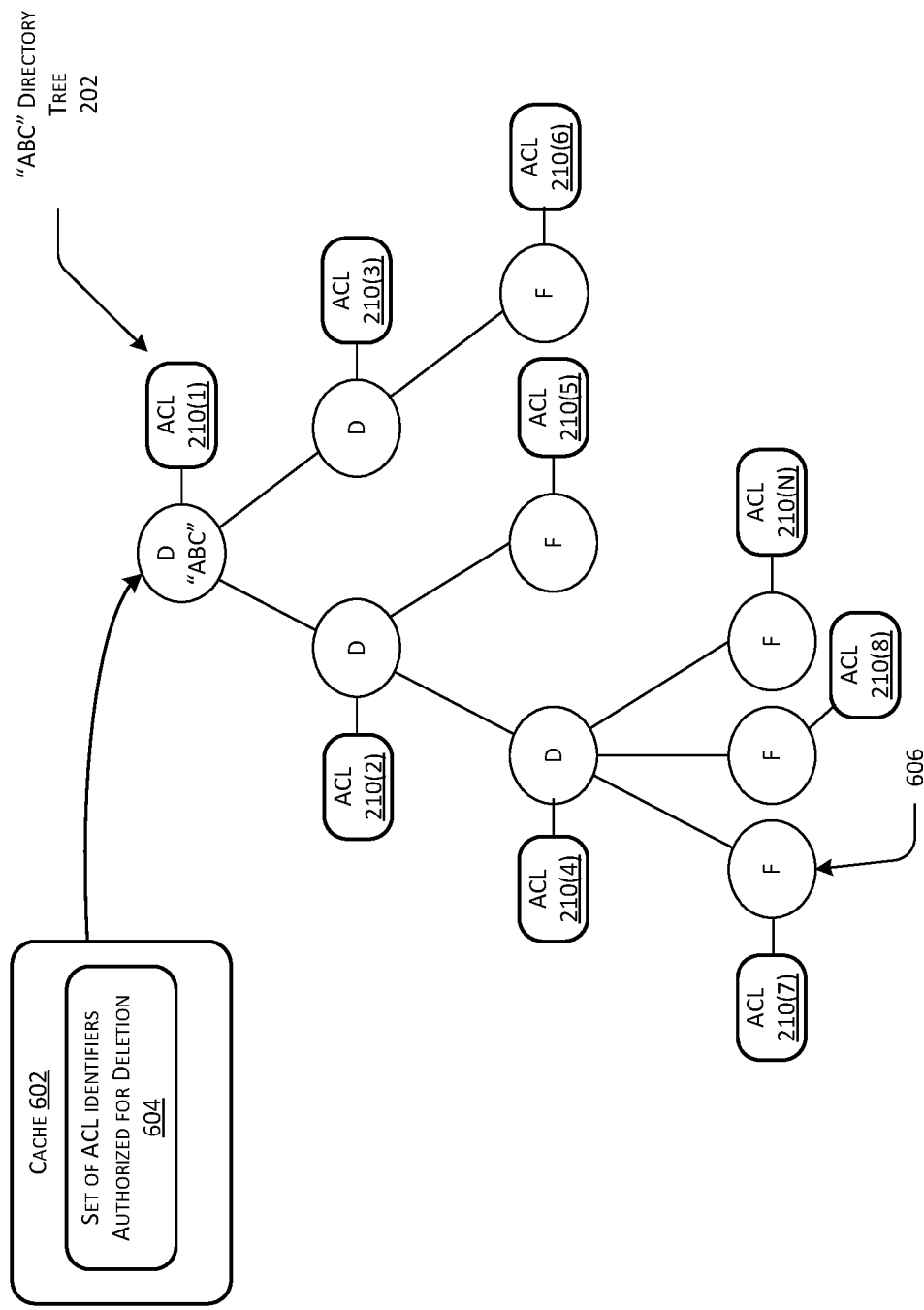
FIG. 6 illustrates a diagram in which a more efficient deletion of files in a directory tree can be implemented.

FIG. 6 illustrates a diagram in which a more efficient deletion of files in a directory tree can be implemented. As shown, the "ABC" directory tree 202 of FIG. 2 is associated with a cache 602. The cache 602 is configured to store identifiers for the ACLs 210(1-N). After, the file system 102 identifies a match between a particular token list entry and a particular ACL entry for a given file or directory in the "ABC" directory tree 202 and confirms the delete operation is authorized (an example of which is described above in FIG. 2), the file system 102 adds an identifier for the ACL in which the particular ACL entry is included to the cache 602. Accordingly, the cache 602 includes a set of ACL identifiers that are authorized for deletion based on the token 120. Prior to deleting a file or a directory, the file system 102 can check the cache 602 to determine if the identifier for the ACL associated with the file or the directory has already been authorized for deletion. For instance, while checking to see if file 606 can be deleted, the file system 102 checks the cache 602 for an identifier associated with ACL 210(7). Consequently, the deletion of file 606 is optimized because the file system 102 does not need to perform the iterations described above with respect to FIG. 2 for each file or directory.

Figure 7:
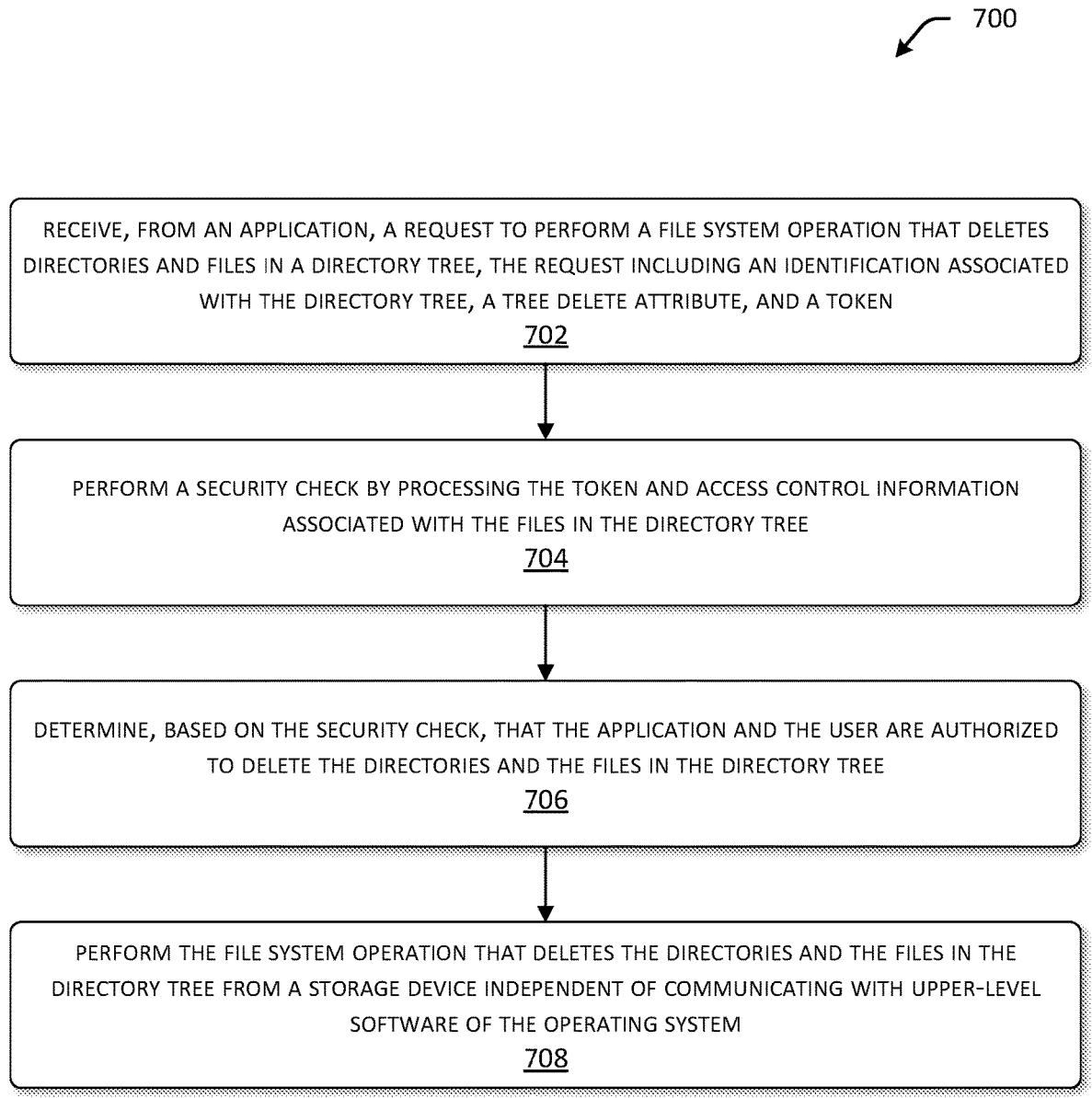
FIG. 7 is an example flow diagram showing aspects of a method for implementing an efficient directory tree deletion operation in a file system.

Turning now to FIG. 7, an example flow diagram of a method for implementing an efficient directory tree deletion operation in a file system.

At operation 702, the file system receives, from an application, a request to perform a file system operation that deletes directories and files in a directory tree. As described above, the request includes an identification 116 associated with the directory tree, a directory tree delete attribute 118, and a token 120 indicating an identity of the application 108 and a user 122 that initiates the request via the application 108.

At operation 704, the file system performs a security check by process the token and access control information associated with the files in the directory tree. For example, a security check is performed for an individual file by iterating through token list entries and access control list entries to identify a token list entry that matches an access control list entry. After a match is identified, the file system can confirm that the matched access control list entry authorizes deletion of the file.

At operation 706, the file system determines, based on the security check, that the application and the user are authorized to delete the directories and the files in the directory tree.

At operation 708, the file system performs the file system operation that deletes the directories and the files in the directory tree from a storage device independent of (e.g., without) communicating with the upper-level software of the operating system.

For ease of understanding, the method discussed in this disclosure is delineated as separate operations represented as independent blocks. However, these separately delineated operations should not be construed as necessarily order dependent in their performance. The order in which the method is described is not intended to be construed as a limitation, and any number of the described blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Figure 8:
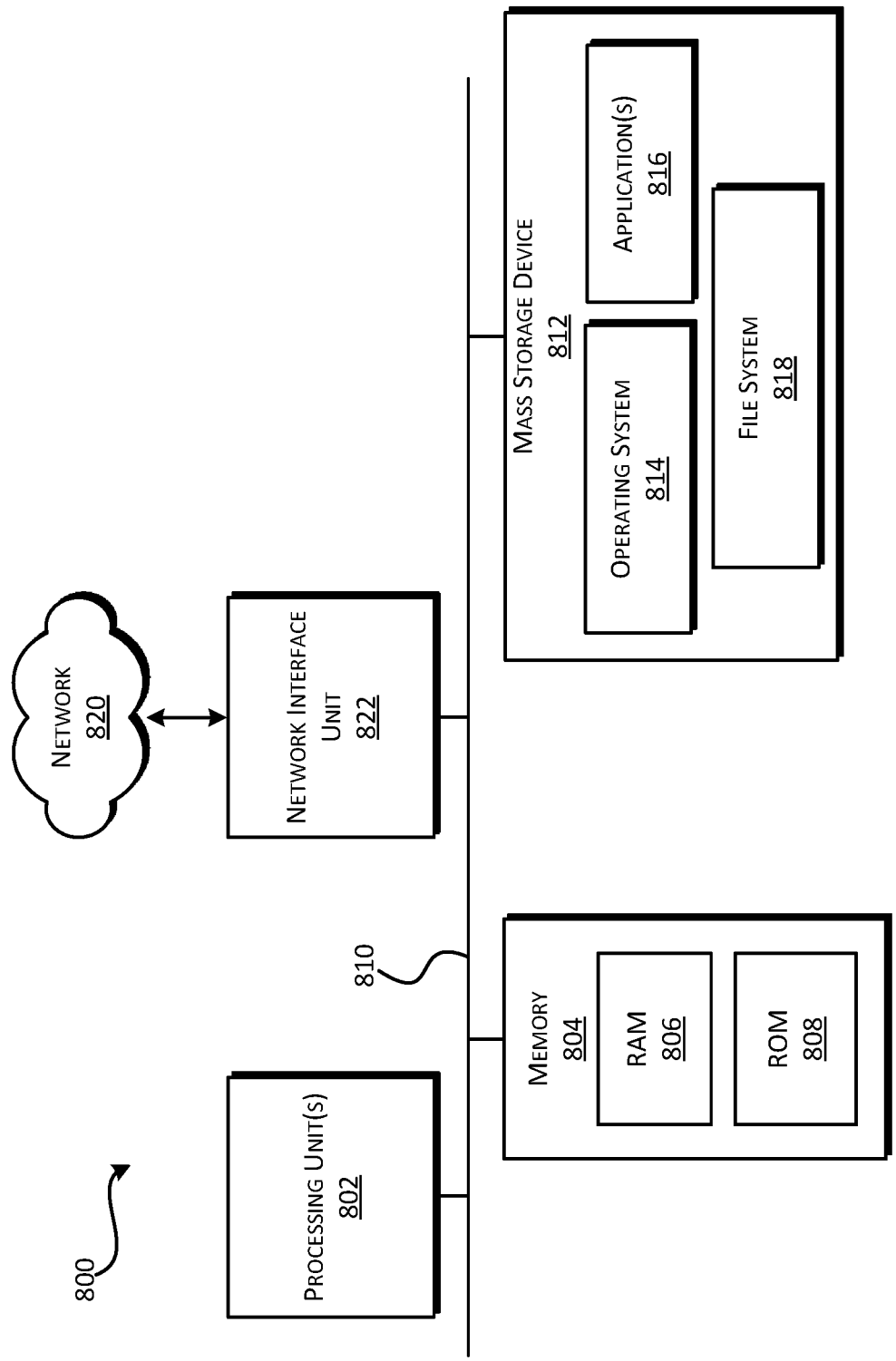
FIG. 8 is a computer architecture diagram showing an illustrative computer hardware and software architecture for a computing system capable of implementing aspects of the techniques and technologies presented herein.

FIG. 8 shows additional details of an example computer architecture 800 for a device, such as a computer or a server capable of executing computer instructions. The computer architecture 800 illustrated in FIG. 8 includes processing unit(s) 802, a system memory 804, including a random-access memory 806 (RAM) and a read-only memory (ROM) 808, and a system bus 810 that couples the memory 804 to the processing unit(s) 802. The processing units 802 may also comprise or be part of a processing system. In various examples, the processing units 802 of the processing system are distributed. Stated another way, one processing unit 802 of the processing system may be located in a first location (e.g., a rack within a datacenter) while another processing unit 802 of the processing system is located in a second location separate from the first location.

Processing unit(s), such as processing unit(s) 802, can represent, for example, a CPU-type processing unit, a graphical processing unit (GPU), a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 800, such as during startup, is stored in the ROM 808. The computer architecture 800 further includes a mass storage device 812 for storing an operating system 814, application(s) 816, a file system 818, and other data described herein.

The mass storage device 812 is connected to processing unit(s) 802 through a mass storage controller connected to the bus 810. The mass storage device 812 and its associated computer-readable media provide non-volatile storage for the computer architecture 800. Although the description of computer-readable media contained herein refers to a mass storage device, it should be appreciated by those skilled in the art that computer-readable media can be any available computer-readable storage media or communication media that can be accessed by the computer architecture 800.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 800 may operate in a networked environment using logical connections to remote computers through the network 820. The computer architecture 800 may connect to the network 820 through a network interface unit 822 connected to the bus 810.

It should be appreciated that the software components described herein may, when loaded into the processing unit(s) 802 and executed, transform the processing unit(s) 802 and the overall computer architecture 800 from a general-purpose computing system into a special-purpose computing system customized to facilitate the functionality presented herein. The processing unit(s) 802 may be constructed from any number of transistors or other discrete circuit elements, which may individually or collectively assume any number of states. More specifically, the processing unit(s) 802 may operate as a finite-state machine, in response to executable instructions contained within the software modules disclosed herein. These computer-executable instructions may transform the processing unit(s) 802 by specifying how the processing unit(s) 802 transition between states, thereby transforming the transistors or other discrete hardware elements constituting the processing unit(s) 802.

The disclosure presented herein also encompasses the subject matter set forth in the following clauses.

Example Clause A, a method implemented by a file system of a computing device, comprising: receiving, from an application, a request to perform a file system operation that deletes directories and files in a directory tree, wherein the request includes: an identification associated with the directory tree; a directory tree delete attribute that designates the file system operation to be performed independent of communicating with upper-level software of an operating system; and a token indicating an identity of the application and an identity of a user that initiates the request via the application, the token being useable to determine whether the application is authorized to delete the directories and the files in the directory tree; performing a security check by processing the token and access control information associated with the files in the directory tree; determining, based on the security check, that the application and the user are authorized to delete the directories and the files in the directory tree; and in response to determining that the application and the user are authorized to delete the directories and the files in the directory tree, performing the file system operation that deletes the directories and the files in the directory tree from a storage device independent of communicating with the upper-level software of the operating system.

Example Clause B, the method of Example Clause A, wherein the upper-level software comprises a filter driver.

Example Clause C, the method of Example Clause B, further comprising confirming that the filter driver has provided authorization to perform the file system operation via the directory tree delete attribute.

Example Clause D, the method of Example Clause C, wherein the authorization is specifically provided for a storage unit of the storage device on which the directories and the files are stored.

Example Clause E, the method of Example Clause C, wherein the authorization is specifically provided for the directory tree.

Example Clause F, the method of any one of Example Clauses A through E, wherein: the access control information includes access control lists; and performing the security check comprises, for an access control list associated with a file of the files: iterating through token list entries and access control list entries to identify a token list entry that matches an access control list entry; and confirming that the access control list entry authorizes deletion of the file.

Example Clause G, the method of Example Clause F, further comprising: adding an identifier for the access control list to a cache configured to store identifiers for access control lists the token is authorized to delete; and checking the cache to determine that another file, of the files, associated with the access control list is authorized to be deleted based on the identifier for the access control list having already been added to the cache.

Example Clause H, the method of Example Clause F or Example Clause G, further comprising: tracking a first number of files stored in a directory, the directory including the file; and tracking a second number of files associated with an inherited access control list from the directory, wherein performing the security check comprises: determining that the first number is equal to the second number; deleting the files stored in the directory based on the iterating and the confirming implemented for the access control list associated with the file.

Example Clause I, the method of any one of Example Clauses A through H, wherein: the directory tree delete attribute specifies foreground deletion of the directories and the files in the directory tree; and performing the file system operation comprises executing a foreground thread, based on the foreground deletion specified in the directory tree delete attribute, to delete the directories and the files in the directory tree from the storage device.

Example Clause J, the method of any one of Example Clauses A through H, wherein: the directory tree delete attribute specifies deferred deletion of the directories and the files in the directory tree; and performing the file system operation comprises: executing a foreground thread to remove a name of the directory tree from a namespace; and executing, based on the deferred deletion specified in the directory tree delete attribute, a background thread to delete the directories and the files in the directory tree from the storage device.

Example Clause K, a system comprising: a processing system; a file system; and computer-readable storage media storing instructions that, when executed by the processing system, cause the file system to perform operations comprising: receiving, from an application, a request to perform a file system operation that deletes directories and files in a directory tree, wherein the request includes: an identification associated with the directory tree; a directory tree delete attribute that designates the file system operation to be performed independent of communicating with upper-level software of an operating system; and a token indicating an identity of the application and an identity of a user that initiates the request via the application, the token being useable to determine whether the application is authorized to delete the directories and the files in the directory tree; performing a security check by processing the token and access control information associated with the files in the directory tree; determining, based on the security check, that the application and the user are authorized to delete the directories and the files in the directory tree; and in response to determining that the application and the user are authorized to delete the directories and the files in the directory tree, performing the file system operation that deletes the directories and the files in the directory tree from a storage device independent of communicating with the upper-level software of the operating system.

Example Clause L, the system of Example Clause K, wherein: the upper-level software comprises a filter driver; and the operations further comprise confirming that the filter driver has provided authorization to perform the file system operation via the directory tree delete attribute.

Example Clause M, the system of Example Clause L, wherein the authorization is specifically provided for a storage unit of the storage device on which the directories and the files are stored.

Example Clause N, the system of Example Clause L, wherein the authorization is specifically provided for the directory tree.

Example Clause O, the system of any one of Example Clauses K through N, wherein: the access control information includes access control lists; and performing the security check comprises, for an access control list associated with a file of the files: iterating through token list entries and access control list entries to identify a token list entry that matches an access control list entry; and confirming that the access control list entry authorizes deletion of the file.

Example Clause P, the system of Example Clause O, wherein the operations further comprise: adding an identifier for the access control list to a cache configured to store identifiers for access control lists the token is authorized to delete; and checking the cache to determine that another file, of the files, associated with the access control list is authorized to be deleted based on the identifier for the access control list having already been added to the cache.

Example Clause Q, the system of Example Clause O or Example Clause P, wherein the operations further comprise: tracking a first number of files stored in a directory, the directory including the file; and tracking a second number of files associated with an inherited access control list from the directory, wherein performing the security check comprises: determining that the first number is equal to the second number; deleting the files stored in the directory based on the iterating and the confirming implemented for the access control list associated with the file.

Example Clause R, the system of any one of Example Clauses K through Q, wherein: the directory tree delete attribute specifies foreground deletion of the directories and the files in the directory tree; and performing the file system operation comprises executing a foreground thread, based on the foreground deletion specified in the directory tree delete attribute, to delete the directories and the files in the directory tree from the storage device.

Example Clause S, the system of any one of Example Clauses K through Q, wherein: the directory tree delete attribute specifies deferred deletion of the directories and the files in the directory tree; and performing the file system operation comprises: executing a foreground thread to remove a name of the directory tree from a namespace; and executing, based on the deferred deletion specified in the directory tree delete attribute, a background thread to delete the directories and the files in the directory tree from the storage device.

Example Clause T, computer-readable storage media storing instructions that, when executed by a processing system, cause a file system to perform operations comprising: receiving, from an application, a request to perform a file system operation that deletes directories and files in a directory tree, wherein the request includes: an identification associated with the directory tree; a directory tree delete attribute that designates the file system operation to be performed independent of communicating with upper-level software of an operating system; and a token indicating an identity of the application and an identity of a user that initiates the request via the application, the token being useable to determine whether the application is authorized to delete the directories and the files in the directory tree; performing a security check by processing the token and access control information associated with the files in the directory tree; determining, based on the security check, that the application and the user are authorized to delete the directories and the files in the directory tree; and in response to determining that the application and the user are authorized to delete the directories and the files in the directory tree, performing the file system operation that deletes the directories and the files in the directory tree from a storage device independent of communicating with the upper-level software of the operating system.

While certain example embodiments have been described, these embodiments have been presented by way of example only, and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different files, two different directories).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method implemented by a file system of a computing device, comprising:
   receiving, from an application, a request to perform a file system operation that deletes directories and files in a directory tree, wherein the request includes:
   an identification associated with the directory tree;
   a directory tree delete attribute that designates the file system operation to be performed without communicating with a filter driver of an operating system; and
   a token indicating an identity of the application and an identity of a user that initiates the request via the application, the token being useable to determine whether the application is authorized to delete the directories and the files in the directory tree;
   performing a security check by processing the token and access control information associated with the files in the directory tree;
   determining, based on the security check, that the application and the user are authorized to delete the directories and the files in the directory tree; and
   in response to determining that the application and the user are authorized to delete the directories and the files in the directory tree, performing the file system operation that deletes the directories and the files in the directory tree from a storage device without communicating with the filter driver of the operating system.

2. The method of claim 1, further comprising confirming that the filter driver has provided authorization to perform the file system operation via the directory tree delete attribute.

3. The method of claim 2, wherein the authorization is specifically provided for a storage unit of the storage device on which the directories and the files are stored.

4. The method of claim 2, wherein the authorization is specifically provided for the directory tree.

5. The method of claim 1, wherein:
   the access control information includes access control lists; and
   performing the security check comprises, for an access control list associated with a file of the files:
   iterating through token list entries and access control list entries to identify a token list entry that matches an access control list entry; and
   confirming that the access control list entry authorizes deletion of the file.

6. The method of claim 5, further comprising:
adding an identifier for the access control list to a cache configured to store identifiers for access control lists the token is authorized to delete; and
checking the cache to determine that another file, of the files, associated with the access control list is authorized to be deleted based on the identifier for the access control list having already been added to the cache.

7. The method of claim 5, further comprising:
tracking a first number of files stored in a directory, the directory including the file; and
tracking a second number of files associated with an inherited access control list from the directory, wherein performing the security check comprises:
  determining that the first number is equal to the second number;
  deleting the files stored in the directory based on the iterating and the confirming implemented for the access control list associated with the file.

8. The method of claim 1, wherein:
the directory tree delete attribute specifies foreground deletion of the directories and the files in the directory tree; and
performing the file system operation comprises executing a foreground thread, based on the foreground deletion specified in the directory tree delete attribute, to delete the directories and the files in the directory tree from the storage device.

9. The method of claim 1, wherein:
the directory tree delete attribute specifies deferred deletion of the directories and the files in the directory tree; and
performing the file system operation comprises:
  executing a foreground thread to remove a name of the directory tree from a namespace; and
  executing, based on the deferred deletion specified in the directory tree delete attribute, a background thread to delete the directories and the files in the directory tree from the storage device.

10. A system comprising:
a processing system;
a file system; and
computer-readable storage media storing instructions that, when executed by the processing system, cause the file system to perform operations comprising:
  receiving, from an application, a request to perform a file system operation that deletes directories and files in a directory tree, wherein the request includes:
    an identification associated with the directory tree;
    a directory tree delete attribute that designates the file system operation to be performed without communicating with a filter driver of an operating system; and
    a token indicating an identity of the application and an identity of a user that initiates the request via the application, the token being useable to determine whether the application is authorized to delete the directories and the files in the directory tree;
  performing a security check by processing the token and access control information associated with the files in the directory tree;
  determining, based on the security check, that the application and the user are authorized to delete the directories and the files in the directory tree; and
  in response to determining that the application and the user are authorized to delete the directories and the files in the directory tree, performing the file system operation that deletes the directories and the files in the directory tree from a storage device without communicating with the filter driver of the operating system.

11. The system of claim 9, wherein the operations further comprise confirming that the filter driver has provided authorization to perform the file system operation via the directory tree delete attribute.

12. The system of claim 11, wherein the authorization is specifically provided for a storage unit of the storage device on which the directories and the files are stored.

13. The system of claim 11, wherein the authorization is specifically provided for the directory tree.

14. The system of claim 10, wherein:
the access control information includes access control lists; and
performing the security check comprises, for an access control list associated with a file of the files:
  iterating through token list entries and access control list entries to identify a token list entry that matches an access control list entry; and
  confirming that the access control list entry authorizes deletion of the file.

15. The system of claim 14, wherein the operations further comprise:
adding an identifier for the access control list to a cache configured to store identifiers for access control lists the token is authorized to delete; and
checking the cache to determine that another file, of the files, associated with the access control list is authorized to be deleted based on the identifier for the access control list having already been added to the cache.

16. The system of claim 14, wherein the operations further comprise:
tracking a first number of files stored in a directory, the directory including the file; and
tracking a second number of files associated with an inherited access control list from the directory, wherein performing the security check comprises:
  determining that the first number is equal to the second number;
  deleting the files stored in the directory based on the iterating and the confirming implemented for the access control list associated with the file.

17. The system of claim 10, wherein:
the directory tree delete attribute specifies foreground deletion of the directories and the files in the directory tree; and
performing the file system operation comprises executing a foreground thread, based on the foreground deletion specified in the directory tree delete attribute, to delete the directories and the files in the directory tree from the storage device.

18. The system of claim 10, wherein:
the directory tree delete attribute specifies deferred deletion of the directories and the files in the directory tree; and
performing the file system operation comprises:
  executing a foreground thread to remove a name of the directory tree from a namespace; and
  executing, based on the deferred deletion specified in the directory tree delete attribute, a background thread to delete the directories and the files in the directory tree from the storage device.

19. Computer-readable storage media storing instructions that, when executed by a processing system, cause a file system to perform operations comprising:
- receiving, from an application, a request to perform a file system operation that deletes directories and files in a directory tree, wherein the request includes:
  - an identification associated with the directory tree;
  - a directory tree delete attribute that designates the file system operation to be performed without communicating with a filter driver of an operating system; and
  - a token indicating an identity of the application and an identity of a user that initiates the request via the application, the token being useable to determine whether the application is authorized to delete the directories and the files in the directory tree;
- performing a security check by processing the token and access control information associated with the files in the directory tree;
- determining, based on the security check, that the application and the user are authorized to delete the directories and the files in the directory tree; and
- in response to determining that the application and the user are authorized to delete the directories and the files in the directory tree, performing the file system operation that deletes the directories and the files in the directory tree from a storage device without communicating with the filter driver of the operating system.

20. The method of claim 1, wherein the filter driver has registered an interest in monitoring deletion of a file in the directory tree.

* * * * *